June 9, 1942.   K. RIESENFELD   2,285,943
DENTAL X-RAY PHOTOGRAPHY
Filed April 5, 1941
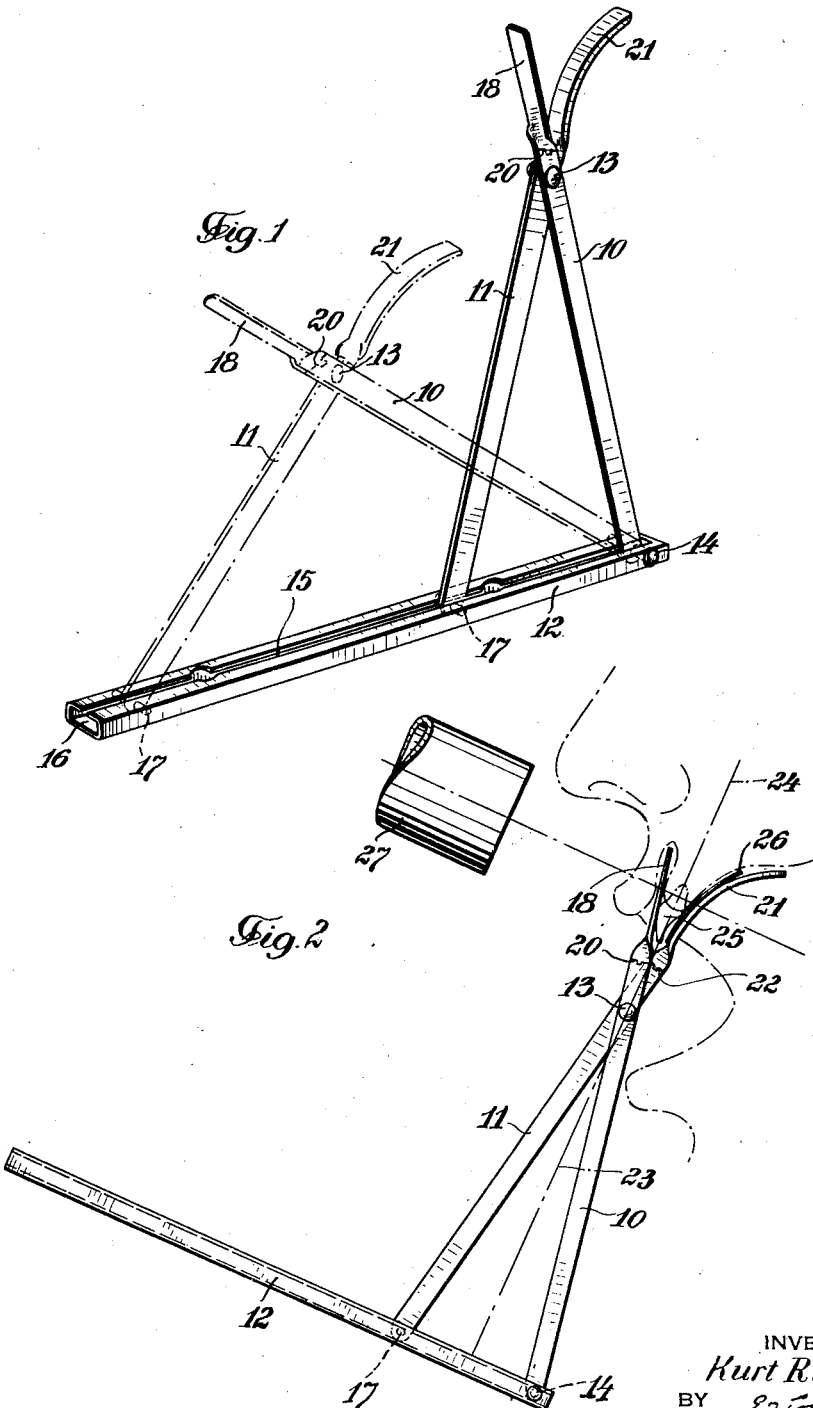
INVENTOR:
Kurt Riesenfeld
BY
ATTORNEY Patented June 9, 1942

2,285,943

UNITED STATES PATENT OFFICE 2,285,943

DENTAL X-RAY PHOTOGRAPHY

Kurt Riesenfeld, Bronx, N. Y.

Application April 5, 1941, Serial No. 387,007
In Great Britain January 25, 1940

5 Claims. (Cl. 250—70)

This invention relates to X-ray photography and more particularly to a device for determining the correct relative position of the film, the tooth to be radiographed and the X-ray tube.

In order to take a radiograph of a tooth a film is usually interposed behind the tooth and the X-ray tube is arranged in front of the tooth. For obtaining an undistorted picture of a tooth the film, the tooth and the X-ray tube must have a predetermined relative position. It is well known that sharp undistorted pictures may only be obtained if the X-ray tube is arranged at right angles to a line bisecting the angle between the film and the front of the tooth. This angle is usually very small, and therefore it is quite difficult to guess the correct direction in which the X-rays have to be projected.

Various devices have been suggested for facilitating dental X-ray photography. However, with the prior devices it was not possible to automatically determine the correct position of the X-ray tube that should form a right angle with the line that bisects the angle between the film and the front of the tooth.

In accordance with the invention I provide a device that allows to automatically obtain the direction that is vertical to the line bisecting the angle between the film and the front of the tooth. A preferred embodiment of the invention comprises two levers pivoted together intermediate their length. The two levers have two arms of equal length. One of the two arms is pivoted to an aligning rod and the second arm is slidable therein in a manner that the two arms always form an isosceles triangle with the aligning rod. Hence, the aligning rod is always at right angles to the line bisecting the angle between the two arms. The two levers extend above their pivot and one of them forms a support for the film while the other one may be pressed against the front of the tooth. Thus it is possible to embrace the tooth between the extensions of the two levers. The aligning rod automatically gives the direction in which the X-rays must be projected in order to obtain an undistorted picture of the tooth.

It is an object of the invention to provide an improved device for aligning an X-ray tube with respect to a tooth to be radiographed and the film in a manner to obtain an undistorted picture of the tooth.

Another object of the invention is to provide a device of the character described which is provided with an aligning rod that is always at right angles with respect to the line bisecting the angle between the film and the front of the tooth.

Still an object of the invention is to provide a device of the type referred to comprising three rods pivoted together, one of the rods being slidable in one of the other rods so that the three rods will always form an isosceles triangle.

These and further objects of the invention will become more apparent in the following description of a preferred embodiment of the invention illustrated in the drawing, wherein:

Fig. 1 is a view in perspective of an embodiment of the invention,

Fig. 2 is a side view of the device illustrated in Fig. 1 showing its application for taking a dental radiograph.

Referring to the drawing the device in accordance with the invention essentially comprises two levers 10 and 11 and aligning rod 12. Levers 10 and 11 are pivoted at 13 for instance by a rivet. Lever 10 is pivotally connected with aligning rod 12 as shown at 14. Pivot 14 may also consist of a rivet. Aligning rod 12 has a longitudinal slot 15 on its upper surface and is formed with an inner recess indicated at 16. Lever 11 has a bolt 17 that slides in recess 16. Levers 10 and 11 have arms of equal length and hence they form an isosceles triangle with aligning rod 12.

Lever 10 has an upper extension 18 which is removable as indicated at 20. Extension 18 has a flat surface that forms substantially a right angle with lever 10. Lever 11 also has a curved extension 21 removable at 22. The flat surfaces of extension 21 faces extension 18. Dotted line 23 bisects the angle formed between the shanks of levers 10 and 11. As is well known line 23 is always arranged at right angles with respect to aligning rod 12 since the levers 10, 11 and rod 12 always form an isosceles triangle. The upper extension 24 of line 23 also bisects the angle formed by extensions 18 and 21. Line 24 further bisects the angle formed between the front of tooth 25 and film 26. The end portion of a customary X-ray tube has been indicated at 27 in Fig. 2.

The mode of application of my improved device will now be apparent.

Film 26 is laid on extension 21 and extension 18 is pressed against the front of the tooth as shown in Fig. 2. Now it is only necessary to align X-ray tube 27 parallel with aligning rod 12. Extension 18 should be removed before a radiograph is taken so that it does not absorb the X-rays. However, it is also feasible to make extension 18 of a material which substantially does not cast a shadow on film 26. Extension 21 is also removable so that it may be sterilized. Preferably extension 21 is made of a flexible metal and hence it may be shaped in accordance with the palate.

It is of course not necessary that the device of the invention is used for holding the film in position while the radiograph is taken. It can simply be used as an indicator, and the film may be held in position during taking of the radiograph by any approved method. Preferably levers 10, 11 and rod 12 are made of rustproof metal.

Various changes and modifications may be made to the details of construction of the invention without departing from the broader spirit and scope thereof, as set forth in the following claims.

I claim:

1. A device of the character described comprising two levers pivotally connected together intermediate their length to form two long arms of equal length and two short arms, an aligning lever pivoted to the end of one of said long arms, the free end of the other one of said long arms having a sliding connection with said aligning lever, said short arms being adapted to bear against the outer faces of a tooth.

2. A device of the character described comprising two levers pivoted together to form two arms of equal length, two members being detachably secured to said levers above said pivot, an aligning lever pivoted to the free end of one of said arms, the free end of the other one of said arms having a sliding connection with said aligning lever whereby said arms and said aligning lever form an isosceles triangle, said detachable members being adapted to bear against the outer faces of a tooth.

3. A device of the character described comprising two levers pivoted together to form two arms of equal length, each of said arms having an extension above said pivot, an aligning lever pivoted to the end of one of said arms, the free end of the other one of said arms being slidable in said aligning lever, said extensions having surfaces arranged at right angles to a plane passing through said arms, one of said extensions being outwardly curved.

4. A device of the character described comprising two rods pivoted together to form two arms of equal length, each of said arms having a detachable extension above said pivot, an aligning rod pivoted to the end of one of said arms, the free end of the other one of said arms being slidable in said aligning rod, said extensions having surfaces arranged at right angles to a plane passing through said arms, one of said extensions being outwardly curved and formed of a flexible metal.

5. A device of the character described comprising two rods pivotally connected together intermediate their length to form two long arms of equal length and two short arms, an aligning lever pivoted to the end of one of said long arms, said aligning lever having a longitudinal slot, the free end of the other one of said long arms being slidable in said slot, one of said short arms being curved, the surfaces of said short arms being arranged at right angles to a plane passing through said long arms.

KURT RIESENFELD.